(12) United States Patent
Van Der Blom

(10) Patent No.: US 6,401,744 B1
(45) Date of Patent: Jun. 11, 2002

(54) VALVE ACTUATOR

(75) Inventor: Nicolaas Van Der Blom, Birkerød (DK)

(73) Assignee: NVB International, Birkerod (DK)

( * ) Notice: Subject to any disclaimer, the term of this patent is extended or adjusted under 35 U.S.C. 154(b) by 0 days.

(21) Appl. No.: 09/554,859

(22) PCT Filed: Nov. 19, 1998

(86) PCT No.: PCT/DK98/00507
§ 371 (c)(1),
(2), (4) Date: May 19, 2000

(87) PCT Pub. No.: WO99/26002
PCT Pub. Date: May 27, 1999

(30) Foreign Application Priority Data

Nov. 19, 1997 (DK) ............................................. 97 00436

(51) Int. Cl.⁷ ............................................... F16K 15/20
(52) U.S. Cl. ......................... 137/231; 137/224; 152/417
(58) Field of Search ................................ 137/231, 223, 137/224; 152/415, 416, 417, 427

(56) References Cited

U.S. PATENT DOCUMENTS

| | | | | |
|---|---|---|---|---|
| 2,489,397 A | * | 11/1949 | Brummer | 137/224 |
| 2,685,906 A | * | 8/1954 | Williams | 152/417 |
| 2,976,906 A | * | 3/1961 | Kamm et al. | 152/417 |
| 3,249,144 A | * | 5/1966 | Dobrikin | 152/417 |
| 4,932,451 A | * | 6/1990 | Williams et al. | 152/417 |
| 4,938,272 A | * | 7/1990 | Sandy, Jr. et al. | 152/427 |
| 5,094,263 A | * | 3/1992 | Hurrell, II et al. | 137/224 |

FOREIGN PATENT DOCUMENTS

| | | | | |
|---|---|---|---|---|
| DE | 2544555 | * | 7/1977 | 137/224 |
| GB | 872246 | * | 7/1961 | 137/231 |
| GB | 977139 | * | 12/1964 | 137/231 |
| WO | 96/10903 | * | 4/1996 | 137/231 |

* cited by examiner

Primary Examiner—John Rivell
Assistant Examiner—Meredith H Schoenfeld
(74) Attorney, Agent, or Firm—Price & Gess

(57) ABSTRACT

The purpose of the invention is to provide a valve actuator with an activating pin of a simple construction. This task is solved by the present invention as recited in claim 1; where in the first position the piston (77, 84) is at a first predetermined distance from the first end (92) of the cylinder (70, 99, 136, 142), in the second position the piston (77, 84) is at a second predetermined distance from the first end (92) of the cylinder (70, 99, 136, 142), said second predetermined distance being larger than said first predetermined distance, and the housing (100, 104, 120, 121, 149, 132) comprises a channel (71, 72, 73, 74, 80, 81, 133, 134, 135) for allowing the conduction of gaseous and/or liquid media between the cylinder (70, 99, 136, 142) and the coupling section (103, 110, 130, 147) when the piston is in the first piston position, inhibiting the conduction of gaseous and/or liquid media between the cylinder (70, 99, 136, 142) and the coupling section (103, 110, 130, 147) when the piston is in the second piston position.

32 Claims, 5 Drawing Sheets

G-G

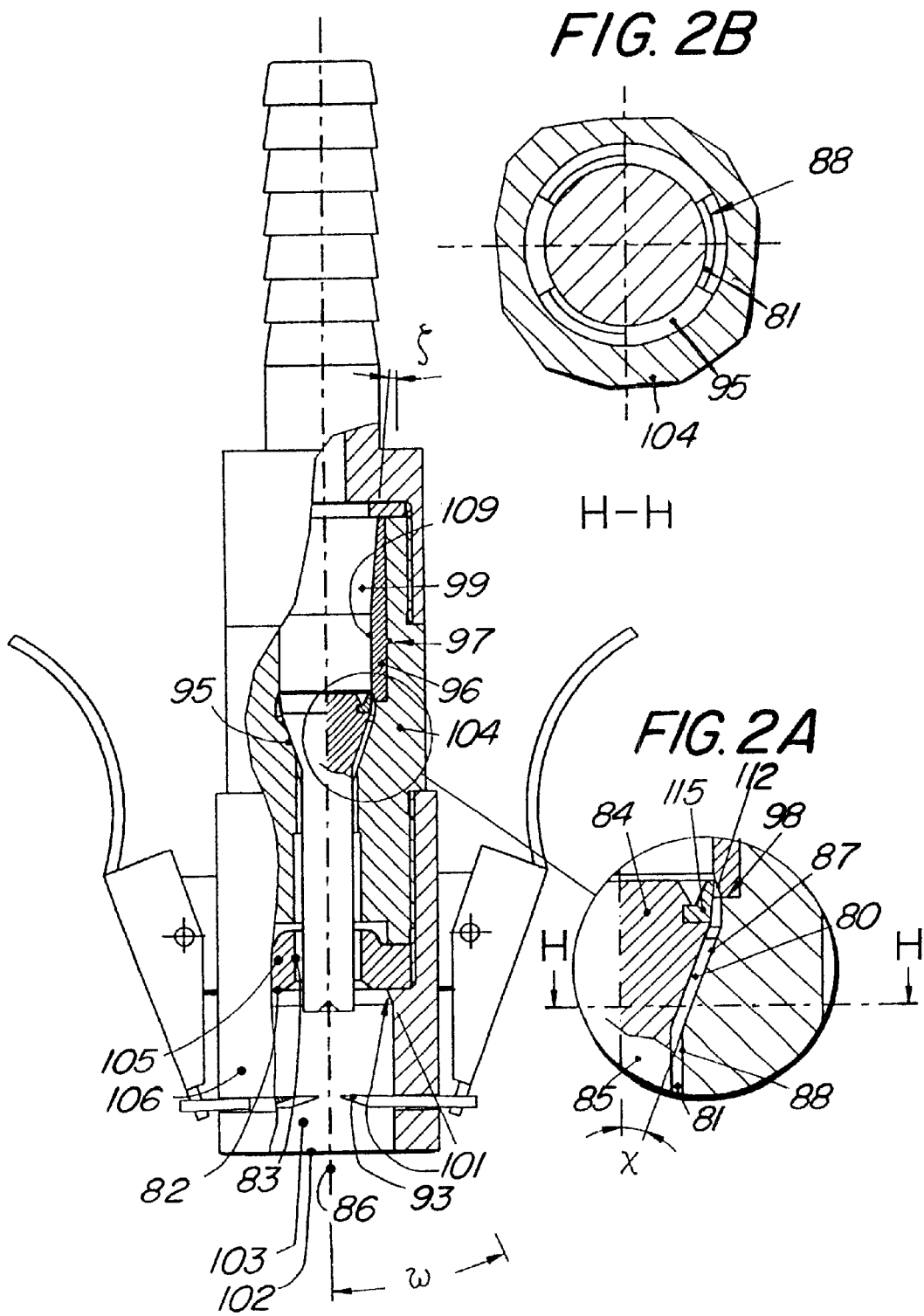

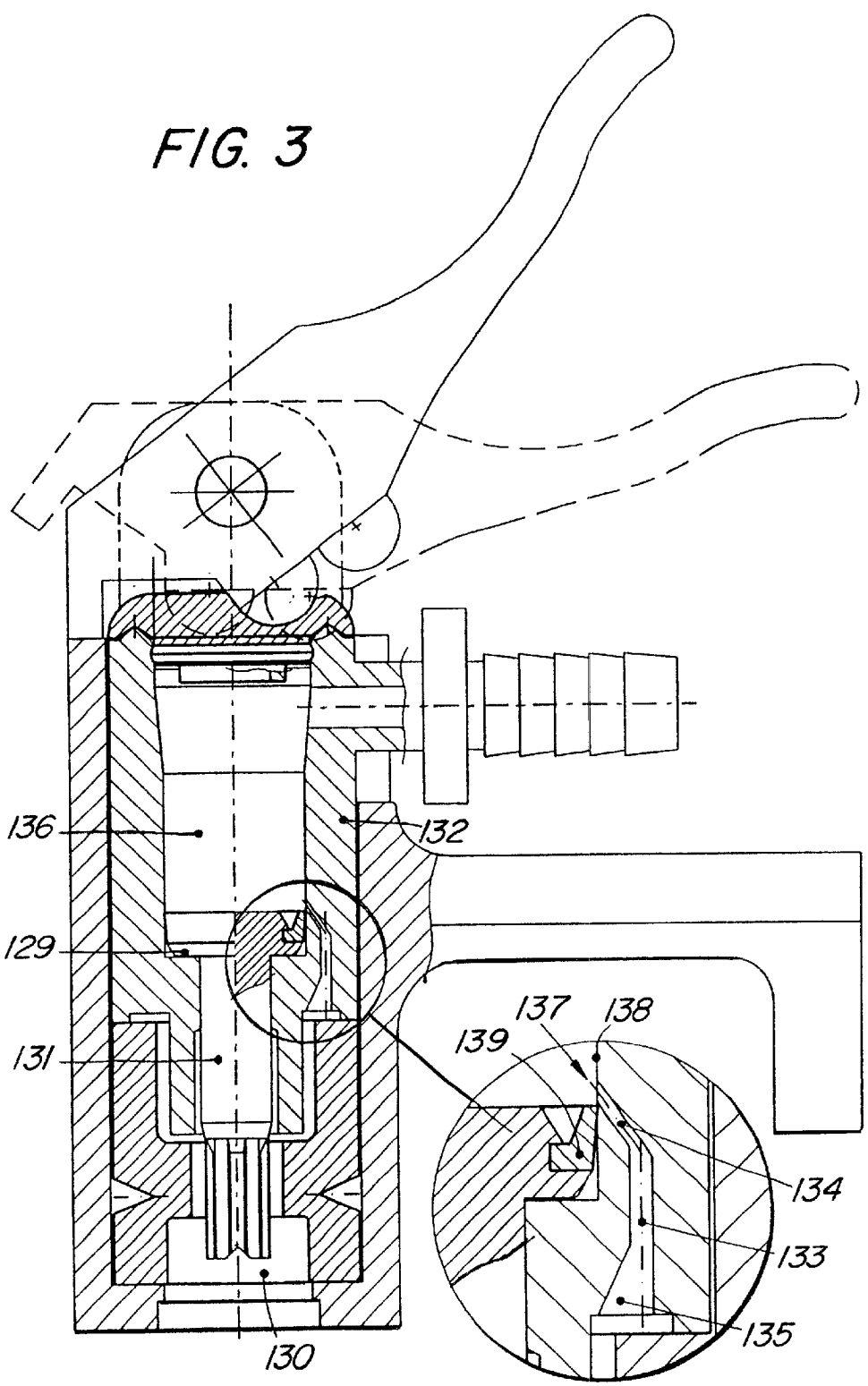

VALVE ACTUATOR

FIELD OF THE INVENTION

The present invention relates generally to a valve actuator for valves having a spring-force operated valve core, according to the preamble portion of claim 1.

BACKGROUND OF THE INVENTION

A valve connector comprising a valve actuator according to the preamble portion of claim 1 and having an activating pin which is designed as a piston rod of a piston movable in a cylinder and which can move towards a valve under the pressure of liquid and/or gaseous media from a pressure source is well-known from WO-A-96/10903. The conduction channel for conducting pressure media from the cylinder to the coupling section is designed as a central bore of the piston and a radial bore in the piston rod and is controlled by an O-ring of the housing to be open toward the coupling section in the first position of the piston. In the second position of the piston, the passage of the pressure media is inhibited by the O-ring which sealingly cooperates with the piston rod. However, one disadvantage of conventional activating pins is their several tiny parts. The complexity of these conventional activating pins makes production of conventional valve connectors more expensive than necessary.

SUMMARY OF THE INVENTION

The valve actuator of the present invention and embodiments thereof are subjects of claim 1 and 2 to 17, respectively. A valve connector and a pressure vessel or hand pump, comprising a valve actuator of the present invention are subjects of claims 18 and 19, respectively. Claim 20 is directed to the use of the valve actuator in a stationary construction.

The present invention provides a valve actuator which comprises an inexpensive combination of a cylinder, within in which the piston driving the activating pin moves, and an activating pin, having a simple construction. This combination can be used in stationary constructions, such as chemical plants, where the activating pin engages the core of a spring force operated valve (e.g. a release valve), as well as in valve connectors (e.g. for inflating vehicle tires). The disadvantage of conventional valve connectors have been overcome by the valve actuator of the present invention. This valve actuator features a piston having a piston ring fitting into the cylinder, where the piston, in its first position, is at a first predetermined distance from the first end of the cylinder. In the piston's second position, it is at a second predetermined distance from the first end of the cylinder, wherein the second predetermined distance is larger than the first predetermined distance. The cylinder wall comprises a conducting channel for allowing conduction of gaseous and/or liquid media between the cylinder and the coupling section when the piston is in the first position, whereas conduction of gaseous and/or liquid media between the cylinder and the coupling section is inhibited by the piston when the piston is in the second position.

One embodiment of the valve actuator of the present invention according to claim 6 features a conducting channel from the pressure source to the valve to be actuatedthat comprises an enlargement of the cylinder diameter which is arrangend around the piston of the activating pin in the bottom of the cylinder, when the piston is in the first position, enabling the medium from the pressure source to flow to the opened spring-force operated valve, e.g. a Schrader valve. The enlargement of the cylinder's diameter may be uniform, or the cylinder wall may contain one or several sections near the bottom of the cylinder where the distance between the center line of the cylinder and the cylinder wall increases so that gaseous and/or liquid media can freely flow around the edge of the piston ring when the piston is in the first position. A variant of this embodiment has a valve actuator arrangement of which its cylinder has the enlargement of the diameter twice. The distance between the enlargements can be the same as the distance between the sealing levels of the sealing means. When three valves of different sizes can be coupled the valve actuator may comprise a cylinder with three enlargements. It is however also possible to connect valves of different sizes to a valve actuator having a single arrangement for the enlargement of the diameter of the cylinder. Now therefore the number of enlargements can be different from the number of different valve sizes of valves which can be coupled.

Another embodiment of the present invention according to claim 10 features a conducting channel through a part of the body of the valve actuator. The channel forms a passage for gaseous and/or liquid media between the cylinder and the part of the valve actuator which is coupled to the valve. The orifice of the channel opening in the cylinder is located such that, when the piston is in the first position, pressurized gaseous and/or liquid media flowing from the pressure source to the cylinder may flow further through the channel to the valve to be actuated. When the piston is in the second position, it blocks the cylinder so that the flow of pressurized gaseous and/or liquid media into the channel is not possible.

Instead of air, (mixtures of) gases and/or liquids of any kind can activate the activation pin and can flow around the piston of the valve actuator when the piston is in its first position. The invention can be used in all types of valve connectors to which a spring-force operated core (e.g. a Schrader valve) can be coupled irrespective of the method of coupling or the number of coupling holes in the connector. Furthermore the valve actuator can be coupled to for example a foot pump, car pump, or compressor. The valve actuator can also be integrated in any pressure source (e.g. a handpump or a pressure vessel) irrespective of the availability of a securing means in the valve connector. It is also possible for the invention to be used in permanent constructions where the activating pin of the actuator engages the core of a permanently mounted valve.

The various embodiments described above are provided by way of illustration and should not be constructed to limit the invention. Those skilled in the art will readily recognize various modifications and changes which may be made to the present invention without strictly following the exemplary embodiments and applications illustrated and described herein, and without departing from the true spirit and scope of the present invention as claimed.

DESCRIPTION OF THE DRAWINGS

The foregoing features and other aspects of the invention are explained in the following description in connection with the accompanying drawings, wherein:

FIG. 2 shows a second embodiment of the valve actuator in a universal clip-on valve connector with a streamlined activating pin, FIG. 2A shows an enlargement of a detail of FIG. 2, FIG. 2B shows section H—H of FIG. 2A, FIG. 3 shows a third embodiment of the valve actuator in a squeeze-on valve connector, FIG. 3A shows an enlargement of a detail of FIG. 3.

FIG. 1 shows a valve actuator in a clip-on valve connector to be cpoupled to e.g. a Schrader valve. The piston 77 is very near the first end 92 of the cylinder 70. The connector has a housing 100 and the sealing means comprises one annular portion 75. The securing means comprises temporary thread 76. The housing also has a center axis 79 and a coupling section 110.

FIG. 1A shows an enlarged detail of FIG. 1. The cylinder 70 has a cylinder wall portion 111 with a diameter which fits the piston ring 108 of the piston 77. Near its first end 92, the cylinder wall comprises enlargement wall portions 75a, 75b, 76a with an enlarged diameter, comprising flow channel portions 71, 72, 73 around the piston means 77, 108 when the activating pin has enough opened the core of the valve. The flow from the pressure source to the valve can now be established. The first end 92 of the cylinder 70 functions here as a stop for the movement of the activating pin. The channel portions 73 and 74 are parts of the piston control means 76c. These parts can have several shapes which depend on the chosen production technique: e.g., channel portions 73, 74 as sector parts of a circle and (107) as cylinders made by injection moulding, while alternatively channel portions (107) could also be drilled holes. Channel portions 73, 74 could be considered 'flow shaped', and are constructed to reduce aerodynamic drag. The inclined enlargement wall portion 75a has an angle $\tau$ with the center axis 79, which is larger than 0° and smaller than 20°, normally in the interval $1°<\tau<12°$ with respect to the direction of the gaseous and/or liquid medium or media, respectively coming from the pressure source. The piston control means 76c has three grooves with walls 76a and 76b, respectively. The wall 76a has an angle $\omega$ which is larger than 0° and smaller than 20° (usually in the interval between 6° and 12°) with respect to the direction of the gaseous and/or liquid medium or media coming from the pressure source. The alternative for the forementioned channel portions 73 and 74 are channels (107) where the piston control has no grooves. In this alternative, a hole (107) parallel to the center axis 79 and beside the piston control connects channel portion 75b (shown as three holes with dotted lines) and the coupled hole.

FIG. 1B shows section G—G from FIG. 1A, with the channel portions 73 and 74 and the stopper 92. The alternative channel portion (107) is sketched by dotted lines.

FIG. 2 shows a valve actuator in a universal clip-on valve connector with the housing 104 and with a sealing means comprising a first annular portion 82 and a second annular sealing portion 83 situated coaxially with the center axis 86 of the coupling section, in the direction of the center axis 86 of the coupling section 103. The first annular sealing portion 82 is closer to the opening 102 of the coupling section than the second annular sealing portion 83, and the diameter of the first annular sealing portion 82 is larger than the diameter of the second annular sealing portion 83. The coupled valves can be secured by at least one 'clip' (=i.e. temporary thread) 76. However, two clips 93 opposite each other are preferable. A taper cone 101 near the sealing surface 82 helps center the valve. The taper cone has an angle $\overline{\omega}$ with the center axis 86, and normally this angle is >45°. A seperate cylinder sleeve 96 with cylinder wall portion 109 is shown which is sealed. It is fastened by for example a snap-lock 97 in the wall of the housing 104. This is an economical way of making the negative slip angle of the inclined enlargement wall portion 112 possible. The cylinder sleeve 96 has distant from the piston stop 95 and angle $\zeta$, so that the piston ring 108 is non-sealing there.

FIG. 2A shows the channel portions 80 and 81 respectively defined by the enlargement wall portions 87 and 88 of the piston control means, respectively. The activating pin is streamlined with the piston 84 and the piston rod 85. The wall portion 87 has an angle $\kappa$ with the center axis 86 seen in the direction of the medium coming from the pressure source, which is larger than 0° and smaller than 20° (usually in the interval between 6° and 12°). The stepped surface 98 of wall of housing 104 makes an air tight connection from the wall of the cylinder sleeve 96 to the cylinder 99. It is of course also possible to make the air tight connection on the other side of the cylinder. In the bottom of the cylinder sleeve 96 is the inclined enlargement wall portion 112 shown which together with the piston ring 115 forms channel portion 71.

FIG. 2B shows section H—H of FIG. 2A and the stopper 95 for the movement of the activating pin. Also shown is the wall portion 88 and the channel portion 81.

FIG. 3 shows an activating pin which is comparable of the one from FIG. 1. The piston 129 is also shown. The piston rod 131 need not to be sealed against the piston control. The cylinder 136 of the valve actuator is within housing 132 of the valve connector. The coupling section 130 is also shown.

FIG. 3A shows a channel portion 133 with an expansion 135 and a channel portion 134 formed as a radial drilling 134. The piston ring 139 opens and closes this conducting channel at its orifice 137, depending on the position of the activating pin. The direction of the channel portion 134 in relation to the center axis is comparable with the angle $\tau$ of channel portion 71 of FIG. 1A. The wall of expansion 135 has an angle comparable to angle $\omega$ of the wall 76a FIG. 1A. Also shown is the cylinder wall portion 138 of the cylinder 136.

FIG. 4 shows an activating pin and its cylinder, which was shown in FIG. 1. This is built in an assembled pipeline housing means 120, 121 or the like, in which a spring-force operated valve 122 is situated, e.g. a Schrader valve. The activating pin is engaging with the core 123 of the valve.

FIG. 5 shows a valve actuator in a universal valve connector. It is comparable with the one of FIG. 1. However, two sealing means 140, 141 with an in-between distance A can seal two valves of different sizes. Two enlargements 1 and 2 of the diameter of the cylinder 142 in the cylinder wall 150 are shown, with the in-between distance B. An activating pin 143 is also shown, with two engaging levels on a distance B. The in-between distances can be equal or different if for example the valves are of a different type, so that the distance from the core to the sealing is not the same. Between the two enlargements 1 and 2 is a cylindrical wall portion 144, with cylinder portion 145, which fits the piston ring 108. Also is shown the center axis 146, the coupling section 147 and its opening 148 from the housing 149.

Figure 1:
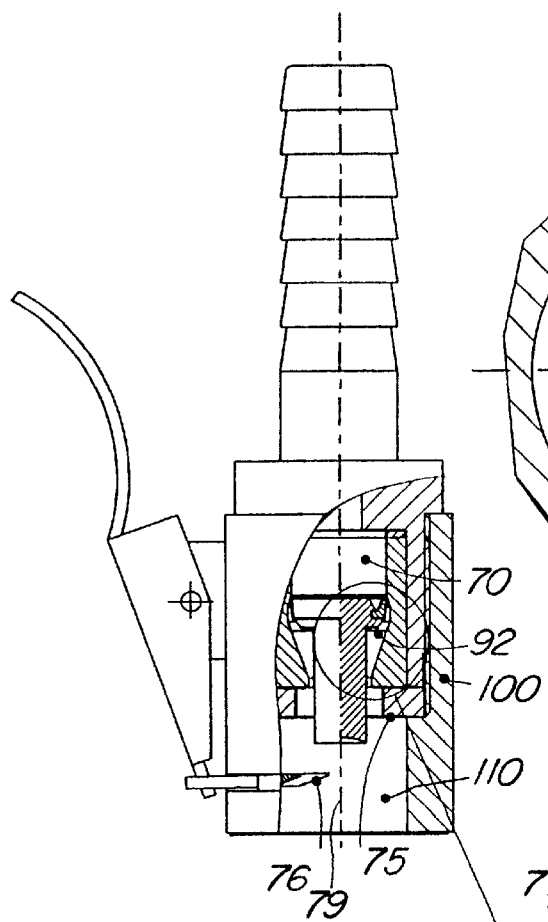
FIG. 1 shows a first embodiment of the valve actuator in a clip-on valve connector to which a Schrader valve can be coupled.
Figure 1B:
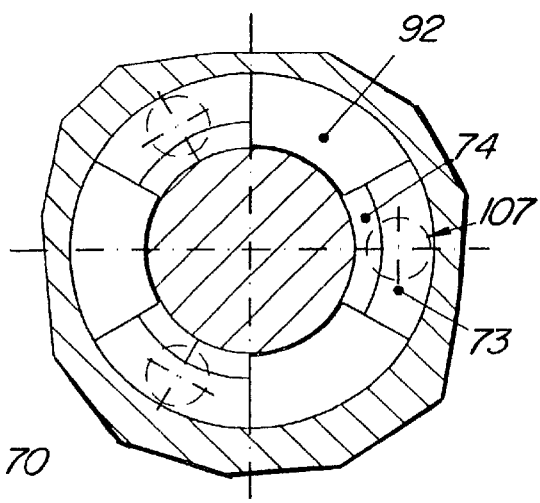
FIG. 1B shows section G—G of FIG. 1A.
Figure 1A:
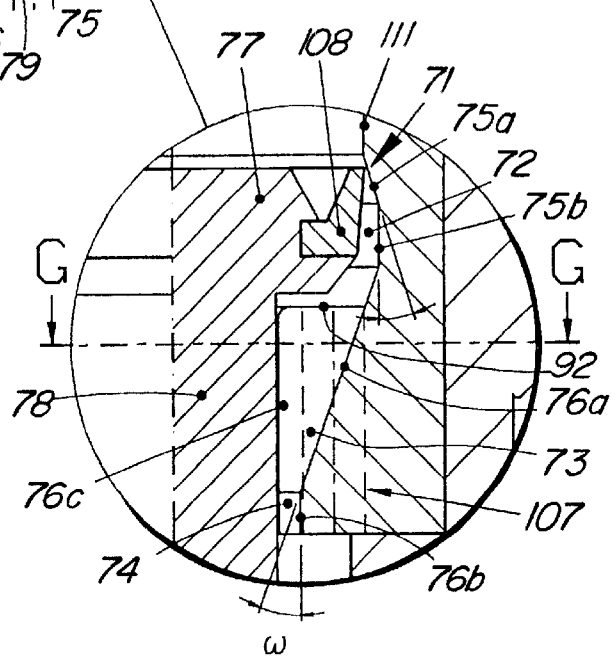
FIG. 1A shows an enlargement of a detail of FIG. 1 with channels around the piston.
Figure 4:
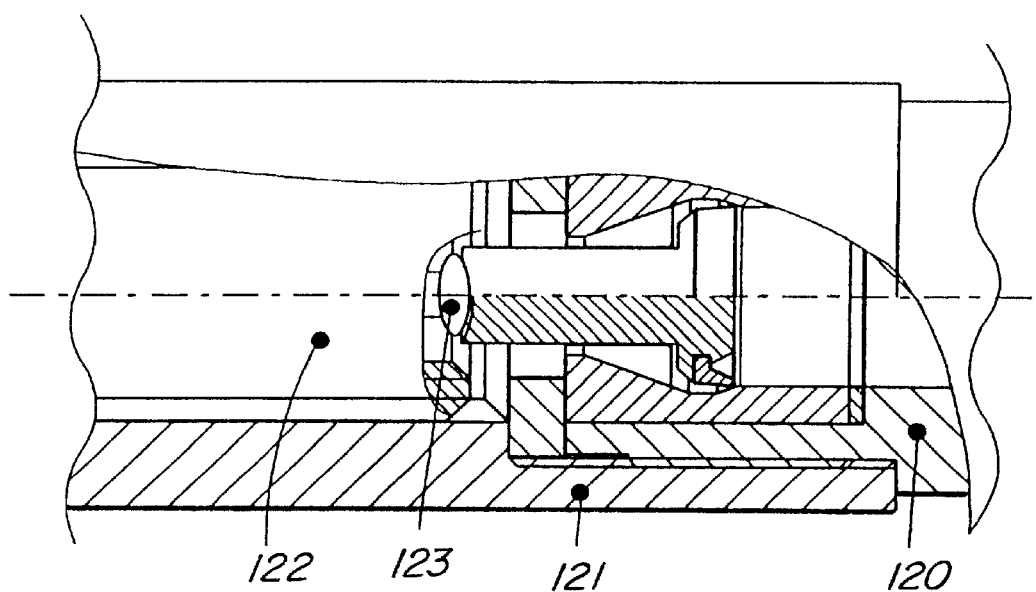
FIG. 4 shows the valve actuator including an activating pin and the wall of the cylinder in a permanent assembly (e.g. from a chemical plant)
Figure 5:
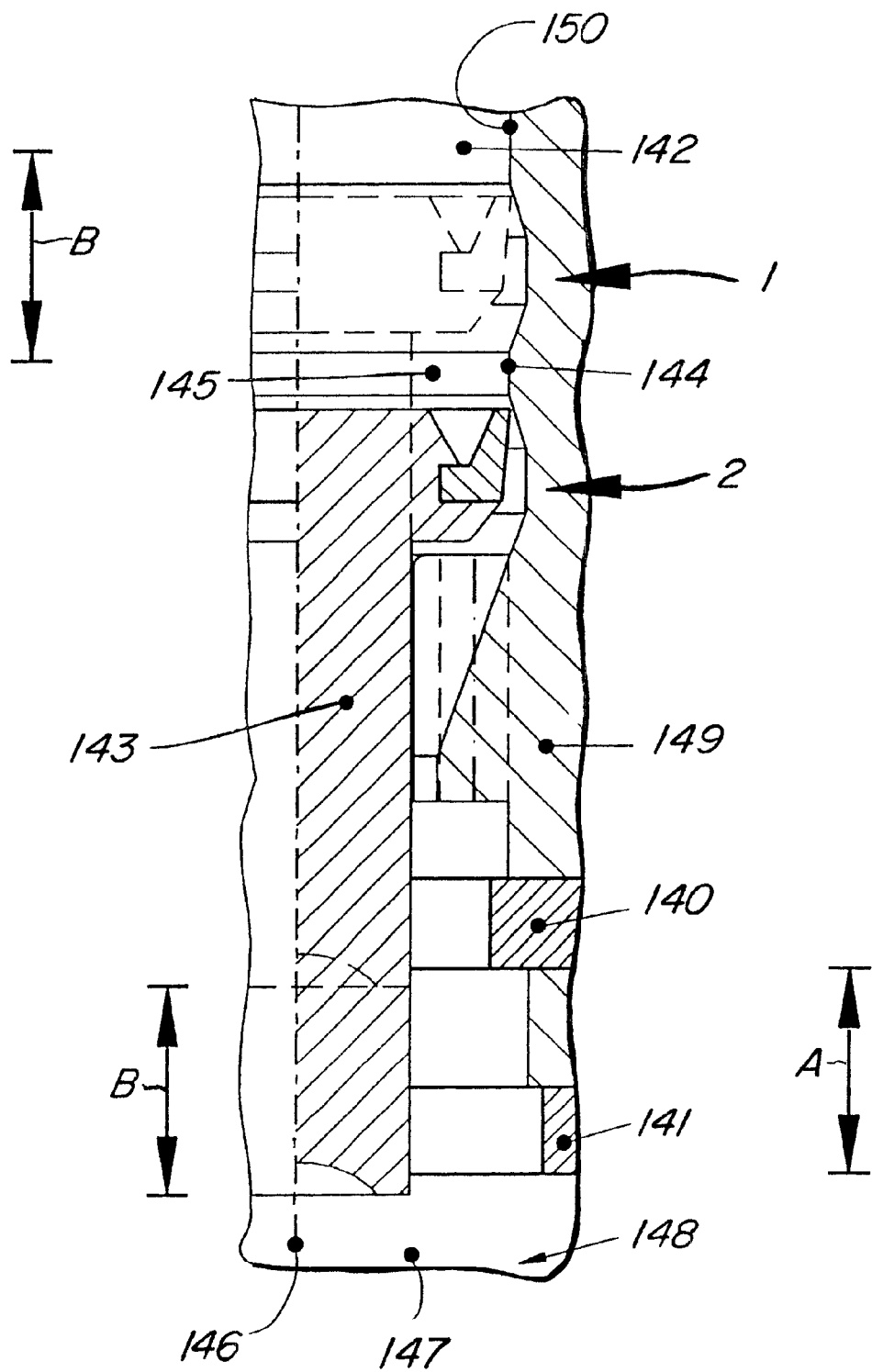
FIG. 5 shows a fourth embodiment of the valve actuator in a universal valve connector.

What is claimed is:

1. A valve actuator for operating with valves having a spring-force operated valve core pin, comprising:

a housing to be connected to a pressure medium source;

within the housing
a coupling section for receiving the valve to be actuated,
a cylinder circumferentially surrounded by a cylinder wall of a predetermined cylinder wall diameter and having a first cylinder end and a second cylinder end which is farther away from the coupling section than said first cylinder end and is connected to the housing for receiving pressure medium from said pressure source,
a piston which is movably located in the cylinder and fixedly coupled to an activating pin for engaging with the spring-force operated valve core pin of the valve received in the coupling section, and
a conducting channel between said second cylinder end and said coupling section for conducting pressure medium from said second cylinder end to the coupling section when the piston is moved into a first piston position in which the piston is at a first predetermined distance from said first cylinder end, said conduction of pressure medium between said second cylinder end and the coupling section being inhibited when the piston is moved into a second piston position in which the piston is at a second predermined distance from said first cylinder end which second distance being larger than said first distance, wherein
the conducting channel is arranged in said cylinder wall and has a channel portion which opens into the cylinder at a cylinder wall portion having said predetermined cylinder wall diameter, and
the piston comprises a piston ring with a sealing edge which sealingly fits with said cylinder wall portion, said sealing edge of the piston ring being located between said channel portion and said second cylinder end in said second piston position, thereby inhibiting said conduction of the pressure medium from said second cylinder end into the channel in said second piston position, and being located between said channel portion and said first cylinder end in said first piston position, thereby opening the channel to said second cylinder end in said first piston position.

2. Valve actuator according to claim 1, wherein said first predetermined distance is greater than zero.

3. Valve actuator according to claim 1, wherein said first predetermined distance is approximately zero.

4. Valve actuator according to claim 3, wherein it comprises a stopper to limit the movement of the piston in the first piston position.

5. Valve actuator according to claim 3, wherein it comprises a tapered portion at the first end of the cylinder and a conical portion of the piston to coincide with said tapered portion when the piston is in the first piston position.

6. Valve actuator according to claim 1, wherein the conducting channel is formed by an enlargement of the cylinder wall diameter which is arranged to be radially around the piston when being in its first piston position so that the pressure medium can freely flow around the edge of the piston ring when the piston is in its first piston position.

7. Valve actuator according to claim 6, wherein the enlargement of the cylinder diameter is formed at one or several sections of the circumference of the cylinder wall.

8. Valve actuator according claim 6 or 7, wherein that the wall of the enlargement comprises a cylindrical enlargement wall portion and an inclined enlargement wall portion forming an angle with the cylinder axis which is larger than 0° and smaller than 20°, wherein the inclined enlargement wall portion is situated between the cylindrical enlargement wall portion and the cylinder wall portion having the predetermined cylinder wall diameter.

9. Valve actuator according to claim 8, wherein a channel portion of the conducting channel between the cylindrical enlargement wall portion and the coupling section is designed as a tapered channel portion shaped as a groove or is designed as a hole which is parallel to the center axis of the cylinder.

10. Valve actuator according to claim 1, wherein the coupling section is connected by the conducting channel to an orifice in the cylinder wall portion, said orifice being situated at a distance from the first cylinder end so that the orifice is situated between the piston and the second end of the cylinder when the piston is in the first piston position.

11. Valve actuator according to claim 1, wherein the piston is further movable within the cylinder to a third position and a fourth position, corresponding to a third predetermined distance and a fourth predetermined distance from the first end of the cylinder, respectively, where said third predetermined distance is larger than said second predetermined distance and said fourth predetermined distance is larger than said third predetermined distance; and
the cylinder comprises a second channel for
allowing the conduction of gaseous and/or liquid media between the cylinder and the coupling section when the piston is in said third position and
inhibiting the conduction of gaseous and/or liquid media between the cylinder and the coupling section when the piston is in said fourth position.

12. A valve actuator according to claim 1, wherein it comprises within the coupling section sealing means for sealing the valve actuator onto valves of different types and/or sizes, and the sealing means comprise a first annular sealing portion and a second annular portion situated coaxially with the centre axis of the coupling section and being displaced in the direction of the centre axis of the coupling section, said first annular portion is closer to the opening of the coupling section than said second annular portion, and the diameter of said first annular portion is larger than the diameter of said second annular portion.

13. Valve actuator as claimed in claim 1, wherein it comprises within the coupling section a securing thread for securing the valve actuator onto the inflation valve.

14. Valve actuator as claimed in claim 13, wherein said securing thread is a temporary securing thread.

15. Valve actuator according to claim 6, wherein the cylinder wall is formed as a cylinder sleeve, fastened and sealed in the housing and formed with said inclined enlargement wall portion, the cylinder sleeve having distant from the first cylinder end a wall portion an angle so that the piston ring is not sealing there.

16. Valve actuator according to claim 15, wherein said cylinder sleeve is fastened and sealed by a snap-lock in the wall of the housing.

17. Valve actuator according to claim 1, wherein it comprises within the coupling section a sealing means for sealing the valve actuator onto a valve with a spring-force operated valve core.

18. A valve connector, coupled to a hand pump, a foot pump, a car pump, a pressure vessel or a compressor, for inflating vehicle tires, comprising a valve actuator according to claim 1.

19. A pressure vessel or a hand pump for inflating a vehicle tire, comprising an integrated valve actuator according to claim 1.

20. The valve actuator according to claim 1 further attached to a stationary construction whereby the valve actuator is capable of operating a valve having a spring-force operated valve core pin.

21. A valve actuator for operating with valves having a spring-force operated valve core pin, comprising:
    a housing to be connected to a pressure medium source;
    within the housing
    a coupling section for receiving the valve to be actuated,
    a cylinder circumferentially surrounded by a cylinder wall of a predetermined cylinder wall diameter and having a first cylinder end and a second cylinder end which is farther away from the coupling section than said first cylinder end and is connected to the housing for receiving pressure medium from said pressure source,
    a piston which is movably located in the cylinder and fixedly coupled to an activating pin for engaging with the spring-force operated valve core pin of the valve received in the coupling section, and
    a conducting channel between said second cylinder end and said coupling section for conducting pressure medium from said second cylinder end to the coupling section when the piston is moved into a first piston position in which the piston is at a first predetermined distance from said first cylinder end, said conduction of pressure medium between said second cylinder end and the coupling section being inhibited when the piston is moved into a second piston position in which the piston is at a second predermined distance from said first cylinder end which second distance being larger than said first distance,
    wherein
        the conducting channel is arranged in said cylinder wall and has a channel portion which opens into the cylinder at a cylinder wall portion having said predetermined cylinder wall diameter; and,
        the conducting channel is formed by an enlargement of the cylinder wall diameter which is arranged to be radially around the piston when being in its first piston position so that the pressure medium can freely flow around the edge of the piston ring when the piston is in its first piston position; and,
        the piston comprises a piston ring with a sealing edge which sealingly fits with said cylinder wall portion, said sealing edge of the piston ring being located between said channel portion and said second cylinder end in said second piston position, thereby inhibiting said conduction of the pressure medium from said second cylinder end into the channel in said second piston position, and being located between said channel portion and said first cylinder end in said first piston position, thereby opening the channel to said second cylinder end in said first piston position.

22. The valve actuator according to claim 21, wherein that the enlargement of the cylinder diameter is formed at one or several sections of the circumference of the cylinder wall.

23. The valve actuator according claim 21, wherein that the wall of the enlargement comprises a cylindrical enlargement wall portion and an inclined enlargement wall portion forming an angle with the cylinder axis which is larger than 0° and smaller than 20°, wherein the inclined enlargement wall portion is situated between the cylindrical enlargement wall portion and the cylinder wall portion having the predetermined cylinder wall diameter.

24. The valve actuator according to claim 22, wherein that the wall of the enlargement comprises a cylindrical enlargement wall portion and an inclined enlargement wall portion forming an angle with the cylinder axis which is larger than 0° and smaller than 20°, wherein the inclined enlargement wall portion is situated between the cylindrical enlargement wall portion and the cylinder wall portion having the predetermined cylinder wall diameter.

25. The valve actuator according to claim 23, wherein a channel portion of the conducting channel between the cylindrical enlargement wall portion and the coupling section is designed as a tapered channel portion shaped as a groove or is designed as a hole which is parallel to the center axis of the cylinder.

26. The valve actuator according to claim 23, wherein a channel portion of the conducting channel between the cylindrical enlargement wall portion and the coupling section is designed as a tapered channel portion shaped as a groove or is designed as a hole which is parallel to the center axis of the cylinder.

27. The valve actuator according to claim 24, wherein a channel portion of the conducting channel between the cylindrical enlargement wall portion and the coupling section is designed as a tapered channel portion shaped as a groove or is designed as a hole which is parallel to the center axis of the cylinder.

28. The valve actuator for operating with valves having a spring-force operated valve core pin, comprising:
    a housing to be connected to a pressure medium source;
    within the housing
    a coupling section for receiving the valve to be actuated,
    a cylinder circumferentially surrounded by a cylinder wall of a predetermined cylinder wall diameter and having a first cylinder end and a second cylinder end which is farther away from the coupling section than said first cylinder end and is connected to the housing for receiving pressure medium from said pressure source,
    a piston which is movably located in the cylinder and fixedly coupled to an activating pin for engaging with the spring-force operated valve core pin of the valve received in the coupling section, and
    a conducting channel between said second cylinder end and said coupling section for conducting pressure medium from said second cylinder end to the coupling section when the piston is moved into a first piston position in which the piston is at a first predetermined distance from said first cylinder end, said conduction of pressure medium between said second cylinder end and the coupling section being inhibited when the piston is moved into a second piston position in which the piston is at a second predermined distance from said first cylinder end which second distance being larger than said first distance,
    wherein
        the conducting channel is arranged in said cylinder wall and has a channel portion which opens into the cylinder at a cylinder wall portion having said predetermined cylinder wall diameter;
        the piston comprises a piston ring with a sealing edge which sealingly fits with said cylinder wall portion, said sealing edge of the piston ring being located between said channel portion and said second cylinder end in said second piston position, thereby inhibiting said conduction of the pressure medium from said second cylinder end into the channel in said second piston position, and being located between said channel portion and said first cylinder end in said first piston position, thereby opening the channel to said second cylinder end in said first piston position; and, the coupling section is connected by the conducting channel to an orifice in the cylinder wall portion, said orifice being situated at a distance from the first cylinder end so that the orifice is situated between the piston and the second end of the cylinder when the piston is in the first piston position.

29. A valve actuator for operating with valves having a spring-force operated valve core pin, comprising:

a housing to be connected to a pressure medium source; within the housing a coupling section for receiving the valve to be actuated, a cylinder circumferentially surrounded by a cylinder wall of a predetermined cylinder wall diameter and having a first cylinder end and a second cylinder end which is farther away from the coupling section than said first cylinder end and is connected to the housing for receiving pressure medium from said pressure source, a piston which is movably located in the cylinder and fixedly coupled to an activating pin for engaging with the spring-force operated valve core pin of the valve received in the coupling section, and a conducting channel between said second cylinder end and said coupling section for conducting pressure medium from said second cylinder end to the coupling section when the piston is moved into a first piston position in which the piston is at a first predetermined distance from said first cylinder end, said conduction of pressure medium between said second cylinder end and the coupling section being inhibited when the piston is moved into a second piston position in which the piston is at a second predermined distance from said first cylinder end which second distance being larger than said first distance, wherein the conducting channel is arranged in said cylinder wall and has a channel portion which opens into the cylinder at a cylinder wall portion having said predetermined cylinder wall diameter;

the piston comprises a piston ring with a sealing edge which sealingly fits with said cylinder wall portion, said sealing edge of the piston ring being located between said channel portion and said second cylinder end in said second piston position, thereby inhibiting said conduction of the pressure medium from said second cylinder end into the channel in said second piston position, and being located between said channel portion and said first cylinder end in said first piston position, thereby opening the channel to said second cylinder end in said first piston position;

the piston is further movable within the cylinder to a third position and a fourth position, corresponding to a third predetermined distance and a fourth predetermined distance from the first end of the cylinder, respectively, where said third predetermined distance is larger than said second predetermined distance and said fourth predetermined distance is larger than said third predetermined distance; and the cylinder comprises a second channel for allowing the conduction of gaseous and/or liquid media between a cylinder and the coupling section when the piston is in said third position and inhibiting the conduction of gaseous and/or liquid media between the cylinder and the coupling section when the piston is in said fourth position.

30. A valve actuator for operating with valves having a spring-force operated valve core pin, comprising:

a housing to be connected to a pressure medium source; within the housing a coupling section for receiving the valve to be actuated, a cylinder circumferentially surrounded by a cylinder wall of a predetermined cylinder wall diameter and having a first cylinder end and a second cylinder end which is farther away from the coupling section than said first cylinder end and is connected to the housing for receiving pressure medium from said pressure source, a piston which is movably located in the cylinder and fixedly coupled to an activating pin for engaging with the spring-force operated valve core pin of the valve received in the coupling section, and a conducting channel between said second cylinder end and said coupling section for conducting pressure medium from said second cylinder end to the coupling section when the piston is moved into a first piston position in which the piston is at a first predetermined distance from said first cylinder end, said conduction of pressure medium between said second cylinder end and the coupling section being inhibited when the piston is moved into a second piston position in which the piston is at a second predermined distance from said first cylinder end which second distance being larger than said first distance, wherein the conducting channel is arranged in said cylinder wall and has a channel portion which opens into the cylinder at a cylinder wall portion having said predetermined cylinder wall diameter;

the piston comprises a piston ring with a sealing edge which sealingly fits with said cylinder wall portion, said sealing edge of the piston ring being located between said channel portion and said second cylinder end in said second piston position, thereby inhibiting said conduction of the pressure medium from said second cylinder end into the channel in said second piston position, and being located between said channel portion and said first cylinder end in said first piston position, thereby opening the channel to said second cylinder end in said first piston position; and the valve actuator comprises within the coupling section sealing means for sealing the valve actuator onto valves of different types and/or sizes, and the sealing means comprise a first annular sealing portion and a second annular portion situated coaxially with the centre axis of the coupling section and being displaced in the direction of the centre axis of the coupling section, said first annular portion is closer to the opening of the coupling section than said second annular portion, and the diameter of said first annular portion is larger than the diameter of said second annular portion.

31. The valve actuator according to claim 21, wherein the cylinder wall is formed as a cylinder sleeve, fastened and sealed in the housing and formed with said inclined enlargement wall portion, the cylinder sleeve having distant from the first cylinder end a wall portion an angle so that the piston ring is not sealing there.

32. The Valve actuator according to claim 31, wherein said cylinder sleeve is fastened and sealed by a snap-lock in the wall of the housing.

* * * * *